Patented Nov. 1, 1932

1,885,564

UNITED STATES PATENT OFFICE

WILLIAM P. ter HORST, OF NITRO, WEST VIRGINIA, ASSIGNOR TO THE RUBBER SERVICE LABORATORIES COMPANY, OF AKRON, OHIO, A CORPORATION OF OHIO

MANUFACTURE OF VULCANIZED RUBBER COMPOUNDS

No Drawing. Original application filed January 20, 1927, Serial No. 162,416. Divided and this application filed October 27, 1927. Serial No. 229,271.

The present invention is directed to the manufacture of guanidine derivatives and more particularly to the use of such compounds as accelerators of the vulcanization of rubber. The invention will be understood from the following description and examples wherein the invention is fully set forth and described.

Certain derivatives of guanidine have heretofore been employed as rubber vulcanization accelerators, particularly the mono, di- and tri-phenyl and tolyl derivatives. Symmetrical tri-phenyl-guanidine was one of the first members of this series of compounds to be employed as an accelerator but its activity is so much less than is that of the mono and di-substituted guanidines, that the compound has long ceased to be of any commercial importance to the rubber industry.

I have now discovered a new type of tri-substituted guanidines which comprise much more powerful vulcanization accelerators than are the tri-phenyl or tri-tolyl guanidines heretofore employed. The compounds I have manufactured and which I prefer to employ as accelerators, as shown by the examples hereinafter set forth, comprise derivatives of tri-phenyl-guanidine, wherein the $=N.C_6H_5$ group is replaced by various groups, of which one is the $=N.NH.C_6H_5$ group, that is the characteristic grouping of phenyl-hydrazine.

A tri-substituted guanidine containing this grouping has been made by desulphurizing a thiourea, such as thiocarbanilide, by means of a suitable lead compound, such as litharge, white lead and the like in the presence of an amine containing the $=N-NH-$ grouping, for example, phenyl-hydrazine. Preferably, the reaction is carried out in the presence of a small quantity of alcohol or other suitable solvent. More specifically, approximately equi-molecular proportions, that is 228 parts of thiocarbanilide and 108 parts of phenyl hydrazine, are placed in a suitable closed container, such as an autoclave, together with 250 parts of litharge and approximately 750 cu. cm. of 95% alcohol and the mass maintained at a temperature of approximately 60 to 70° C. for about twenty-four hours or, if desired, for a shorter time at a somewhat higher temperature, but the temperature employed is preferably below the boiling point of the solvent used.

When the reaction is completed, the mixture is withdrawn from the reaction vessel and is filtered while hot to remove the lead sludge from the solution. The residuum is washed with a small quantity of alcohol or with any other solvent corresponding to that employed in the reaction. The combined filtrate is then run into approximately three times its volume of water slightly acidified preferably with hydrochloric acid. In case any thiocarbanilide remains unreacted, it is precipitated from the solution by this step. If any precipitate forms, it is removed by filtration. The filtrate is run into a cold solution of an alkali, such as caustic soda, whereby the guanidine product is precipitated. The product is then separated by filtration of the suspension and may then be washed or, if desired, may be further purified by solution in an acid, such as hydrochloric acid and then precipitated therefrom by means of caustic soda solution.

The product is separated from the suspension by filtration means and is then dried by any suitable process, such as in vacuo. Crystals of symmetrical di-phenyl-phenyl-imino-guanidine, having a light pink color, and possessing a melting point of from 128 to 130° C. are thereby produced.

Tri-substituted guanidines of a similar type have been obtained by employing other amines or amino derivatives in place of the phenyl-hydrazine mentioned in the example. Thus, one molecular proportion of thiocarbanilide has been heated under the conditions previously described with a desulphurizing agent, such as lead oxide in the presence of substantially one molecular proportion of ethylene-di-amine, $C_2H_4(NH_2)_2$. A suitable solvent such as alcohol, benzol and the like, is preferably employed. The resulting reaction product is then purified, preferably in the manner heretofore described.

Other similar products have been obtained by desulphurizing a di-substituted thiourea accelerator in the presence of such basic nitrogen-containing compounds as di-cyan-di-amide, methyl amine, and the like. In a similar manner amines, such as ethylamine, butylamine, and other amines, preferably primary amines can be employed. Likewise, other thioureas than di-phenyl-thiourea mentioned in the examples, have been employed. Thus, the di-tolyl-thioureas, the di-xylyl-thioureas and other di-substituted thioureas when treated in the manner as described, produced products included within my preferred class of tri-substituted guanidines.

The reaction products obtained by operating in the manner as set forth are seen to produce tri-substituted guanidines by the desulphurization of a di-substituted thiourea compound, and preferably such thiourea compounds as are themselves vulcanization accelerators, followed by the amidation of the desulphurized product by means of an ammonia derivative such as the amines and preferably a derivative of an amine containing the =N—NH— grouping. I have found that the most favorable results for the object desired are realized by amidating the desulphurized thiourea by employing for that purpose an amine possessing an electrolytic dissociation constant greater than $3.5 \times 10^{-10}$, the dissociation constant of aniline at 18° by the hydrolytic method. In order that the tri-substituted guanidine obtained shall be effective as a vulcanization accelerator, it is desirable that the compounds employed in the manufacture of the product, shall contain no groups of an acidic nature or other substituting groups that will materially decrease the basicity of the product.

Symmetrical di-phenyl-phenyl-imino-guanidine, that is, desulphurized diphenyl-nidine thiourea, amidated in the presence of phenyl-hydrazine has the following formula:

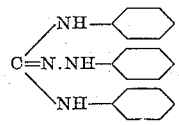

This and the other products hereinbefore mentioned as comprising my preferred class of vulcanization accelerators possesses the general formula

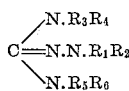

wherein $R_1$, $R_3$ and $R_5$ represent hydrogen, an alkyl, or other group of non-acidic nature, and $R_2$, $R_4$ and $R_6$ represent the same or different aryl groups, or substituted aryl groups. Thus, $R_2$, $R_4$, and $R_6$ comprise such groups as the phenyl, tolyl, xylyl, phenetidyl, anisidyl, di-menthyl-anilido, di-ethyl-anilido or other substituted anilido groups, and the like.

The tri-substituted guanidines of the type hereinbefore mentioned, that is, derivatives containing the

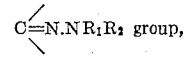

wherein $R_1$ represents preferably an hydrogen atom or alkyl group and $R_2$ represents an aryl group, have been employed as accelerators of the rubber vulcanization process, as are shown by the following examples. Thus, a rubber compound, typical of a friction stock, was mixed in the well known manner and vulcanized. Similar rubber compounds were prepared by employing the well-known di-substituted guanidines as accelerators and the physical characteristics of the vulcanized products were determined and prepared.

The mixes comprised the following ingredients in the proportions as indicated which represent parts by weight:

|  | A | B | C |
|---|---|---|---|
| Pale crepe rubber | 100 | 100 | 100 |
| Sulphur | 3.5 | 3.5 | 3.5 |
| Zinc oxide | 5 | 5 | 5 |
| Di-phenyl-guanidine | 0.5 |  |  |
| Di-o-tolyl-guanidine |  | 0.5 |  |
| Symmetrical di-phenyl-phenyl-imino-guanidine |  |  | 0.5 |

The physical characteristics of the vulcanized products are as follows:

| Time of cure | Stock | Load necessary to produce elongation of | | | Tensile strength at break | Elongation % |
|---|---|---|---|---|---|---|
|  |  | 300% | 500% | 700% |  |  |
| 30 minutes at a temperature of 40 pounds of steam per sq. in. | A | 119 | 275 | 986 | 2585 | 880 |
|  | B | 172 | 388 | 1550 | 3425 | 850 |
|  | C | 162 | 364 | 1495 | 3400 | 855 |
| 1 hour at a temperature of 40 pounds of steam per sq. in. | A | 208 | 450 | 1780 | 3175 | 810 |
|  | B | 269 | 713 | 3015 | 4005 | 770 |
|  | C | 252 | 600 | 2705 | 4175 | 795 |

It is seen from the above comparison, that symmetrical di-phenyl-phenyl-imino-guanidine, representative of my new preferred class of accelerators, produced a vulcanized rubber product that is greatly superior to the rubber compound wherein di-phenyl-guanidine was employed, and also better than that obtained when the most powerful di-substituted guanidine known, that is, di-ortho-tolyl-guanidine, was used.

A hard rubber was obtained by employing the following composition mixed in the ordinary manner:

20 parts of smoked sheet rubber,
20 parts of amber #2 rubber,
5 parts of lime,
15 parts of zinc oxide,
25 parts of sulphur,
10 parts of mineral rubber,
1 part of one of my new accelerators, such as symmetrical di-phenyl-phenyl-imino-guanidine.

A hard rubber product of commercial quality resulted upon heating the above rubber compound for approximately two hours and forty-five minutes in a press at a temperature of 287° F., that is, the temperature given by forty pounds of steam per square inch.

A rubber compound, typical of a composition employed commercially as a tread compound was prepared by mixing in the usual manner 31 parts of smoked sheet rubber,
20 parts of amber #2 rubber,
20.5 parts of zinc oxide,
19 parts of carbon black,
3.5 parts of mineral rubber,
1 part of a softener comprising a blended mineral and vegetable oil,
2 parts of sulphur, and
0.5 parts of one of my new type of accelerators, such as symmetrical di-phenyl-imino-guanidine.

The rubber compound was vulcanized by heating in a press for approximately one hour at a temperature of 287° F., and upon testing was found to possess a modulus of elasticity at 500% elongation of 2805, a tensile strength at break of 3785 pounds per square inch and an ultimate elongation of 620%.

Other compounds included in my new type of tri-substituted guanidines, have been employed as accelerators. Thus, a di-substituted thiourea accelerator, desulphurized and amidated in the presence of ethylene-di-amine, of tetra-methyl-ammonium hydroxide, of piperidine, and other basic organic compounds, possessing an electrolytic dissociation constant greater than $3.5 \times 10^{-10}$, have all shown vulcanization accelerating properties when compounded in rubber mixes. These and other accelerators of this same type, can be employed in rubber compounds similar to those hereinbefore described or in other compounds as are apparent to those skilled in the art of rubber compounding.

The great superiority of my new class of tri-substituted guanidines, as compared with tri-phenyl guanidine as an accelerator is apparent from the following example, wherein the ingredients employed represent parts by weight.

|  | A | B |
|---|---|---|
| Smoked sheet rubber | 100 | 100 |
| Zinc oxide | 15 | 15 |
| Sulphur | 3 | 3 |
| Tri-phenyl-guanidine | 1 |  |
| Symmetrical di-phenyl-phenyl-imino-guanidine |  | 1 |

The above mixes were then vulcanized and the cured product tested with the following results:

| Time of cure | Stock | Load necessary to produce elongation of | | | Tensile strength at break | Elongation % |
|---|---|---|---|---|---|---|
|  |  | 300% | 500% | 700% |  |  |
| 30 minutes at 287° F | A | 68 | 147 | 402 | 669 | 835 |
|  | B | 272 | 589 | 2070 | 3745 | 845 |
| 45 minutes at 287° F | A | 119 | 265 | 705 | 1300 | 840 |
|  | B | 300 | 805 | 2790 | 3980 | 785 |

The examples hereinbefore given are to be understood as illustrative only and not at all limitative of the scope of my invention. Furthermore, my invention is not dependent upon the accuracy of any theories or statements advanced in explanation of the changes taking place in the manufacture or use of the preferred class of accelerators. The invention is limited solely by the following claims, appended hereto as a part of this specification, wherein I intend to claim all novelty inherent in the invention as is permissible in view of the prior art. The dissociation constant hereinbefore mentioned is that obtained by the so-called hydrolytic method at 18° C.

The present application is a division of a copending application Serial No. 162,416, filed January 20, 1927.

What I claim is:

1. The process of manufacturing vulcanized rubber which comprises heating a mixture of rubber and sulphur in the presence of an accelerator comprising a symmetrical di-aryl-aryl-imino-guanidine.

2. The process of manufacturing vulcanized rubber which comprises heating a mixture of rubber and sulphur in the presence of an accelerator comprising symmetrical di-phenyl-phenyl-imino-guanidine.

3. The process of manufacturing vulcanized rubber which comprises heating a mixture of rubber and sulphur in the presence of an accelerator comprising the product obtained by desulphurizing di-phenyl-thiourea and amidating the desulphurized product in the presence of an aryl derivative of hydrazine.

4. The process of manufacturing vulcanized rubber which comprises heating a mixture of rubber and sulphur in the presence of an accelerator comprising a purified heat reaction product of di-phenyl-thiourea, phenyl-hydrazine, a desulphurizing agent and a suitable solvent.

5. A vulcanized rubber product comprising the product resulting from heating rubber and sulphur in the presence of a tri-substituted-guanidine accelerator, said accelerator comprising a di-aryl-substituted thiourea vulcanization accelerator desulphurized and amidated in the presence of an aryl derivative of hydrazine.

6. A vulcanized rubber product comprising the product resulting from heating rubber and sulphur in the presence of a tri-substituted-guanidine accelerator, said accelerator comprising di-phenyl-thiourea desulphurized and amidated in the presence of phenyl-hydrazine.

7. A vulcanized rubber product comprising the product resulting from heating rubber and sulfur in the presence of a tri-substituted-guanidine accelerator, said accelerator comprising a symmetrical di-aryl-aryl-imino guanidine.

8. A vulcanized rubber product comprising the product resulting from heating rubber and sulphur in the presence of a tri-substituted-guanidine accelerator, said accelerator comprising symmetrical di-phenyl-phenyl-imino-guanidine.

In testimony whereof I hereunto affix my signature.

WILLIAM P. ter HORST.